United States Patent [19]

Saito et al.

[11] Patent Number: 5,025,462
[45] Date of Patent: Jun. 18, 1991

[54] X-RAY DETECTOR HAVING FUNCTION OF COMPENSATING FOR SENSITIVITY OF SCINTILLATOR

[75] Inventors: Yasuo Saito, Nishinasunomachi; Seiji Fujimoto, Ootawara; Yasuo Nobuta, Nishinasunomachi; Masahiko Yamazaki, Ootawara, all of Japan

[73] Assignee: Kabushiki Kaisha Toshiba, Kawasaki, Japan

[21] Appl. No.: 540,328

[22] Filed: Jun. 19, 1990

[30] Foreign Application Priority Data

Jun. 21, 1989 [JP] Japan .................................. 1-158801

[51] Int. Cl.⁵ ............................................ G01N 23/00
[52] U.S. Cl. .................................... 378/19; 250/361 R
[58] Field of Search .................. 378/19, 4; 250/361 R

[56] References Cited

U.S. PATENT DOCUMENTS 4,543,490 9/1985 Gupta .

Primary Examiner—Craig E. Church
Attorney, Agent, or Firm—Finnegan, Henderson, Farabow, Garrett and Dunner

[57] ABSTRACT

A multi-channel type solid-state X-ray detector includes a base plate, multi-channel photodiodes arranged on the upper surface of the base plate and having one ends connected as output terminals to electrically conductive lines on the base plate, and a number of scintillators disposed on the photodiodes of respective channels, for generating scintillation light corresponding to incident X-rays when the X-rays are irradiated. Those end portions of the scintillators which lie on the other ends of the photodiodes are extended and a light emitting diode arranged in a flat plate configuration is disposed in contact with the underside of the extended portions on the upper surface of the base plate. The scintillators are shielded with respect to light on portions other than the underside which is in contact with the light emitting diode and photodiodes by reflective coating material or the like, and light from the light emitting diode is permitting to be projected into the entire portion of the scintillators. The light projection compensates for radiation damage of the scintillators and prevents the detection sensitivity of the scintillators from being lowered.

18 Claims, 4 Drawing Sheets

X-RAY DETECTOR HAVING FUNCTION OF COMPENSATING FOR SENSITIVITY OF SCINTILLATOR

BACKGROUND OF THE INVENTION

1. Field of the Invention

This invention relates to an X-ray detector used in an X-ray Computerized Tomography (CT) scanner or the like for converting X-rays into light by means of a scintillator and converting light from the scintillator into an electric signal by means of a photoelectric converter.

2. Description of the Related Art

A multi-channel type X-ray detector is used in X-ray scanners of a second- or succeeding-generation model. An ion-chamber type detector is frequently used as a conventional multi-channel type detector. However, recently, an X-ray detector of solid-state detector type which can be made small and lightweight and whose detection efficiency may be enhanced is used. The solid-state detector has photodiodes of a multi-channel type disposed on a base plate and scintillators arranged thereon for respective channels. Collimators are disposed on the boundaries between the scintillators of respective channels irradiated in a direction perpendicular to the scintillators. When X-rays come into the scintillator of each channel, scintillation light corresponding to the incident X-rays is generated from scintillator and converted into an electric signal by the photodiode, and the electric signal is supplied to a data acquisition system via an electrically conductive line disposed on the base plate.

In the above solid-state detector, use of the scintillator causes problems. That is, a phenomenon in which the scintillator is colored occurs when the X-ray radiation amount increases with an increase in the service time of the detector. The phenomenon is called a radiation damage phenomenon. The coloring phenomenon degrades the scintillation light transmittance efficiency of the scintillator, thereby lowering the detection sensitivity. Further, the colored portion appears in the detection output as the past X-ray radiation history, and consequently, an artifact may appear in the reconstructed tomographic image. The above drawbacks are occurred in other types of X-ray detectors using the scintillator.

SUMMARY OF THE INVENTION

An object of this invention is to provide an X-ray detector for preventing the scintillator from causing the radiation damage phenomenon and lowering the detection sensitivity.

Another object of this invention is to provide an X-ray CT scanner device for preventing occurrence of an artifact in the reconstructed image due to the history of X-ray radiation to the scintillator.

An X-ray detector according to this invention comprises scintillator means for producing scintillation light corresponding to incident X-rays; photoelectric converting means, disposed in contact with the scintillator means, for receiving the scintillation light and generating an electric signal corresponding to the received scintillation light; and means for projecting light onto the scintillator means while the X-rays are not irradiated on the scintillator means.

An X-ray CT scanner device according to this invention comprises X-ray generating means for irradiating X-rays to an object; scintillator means for receiving the X-rays passing through the object and generating scintillation light corresponding to the received X-rays; photoelectric converting means, disposed in contact with the scintillator means, for receiving the scintillation light and generating an electric signal corresponding to the received scintillation light; means for processing an output of the photoelectric converting means to reconstruct a tomographic image; and means, interconnected with the operation of the X-ray generating means, for projecting light to the scintillator means when the X-rays are not irradiated on the scintillator means.

According to this invention, since radiation damage of the scintillator can be compensated for by application of light by using means for projecting light onto the scintillator, the scintillator can be prevented from causing the radiation damage phenomenon and lowering the sensitivity of the X-ray detector and at the same time occurrence of an artifact in the reconstructed tomographic image of the X-ray CT scanner device due to the history of X-ray radiation to the scintillator can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 1:
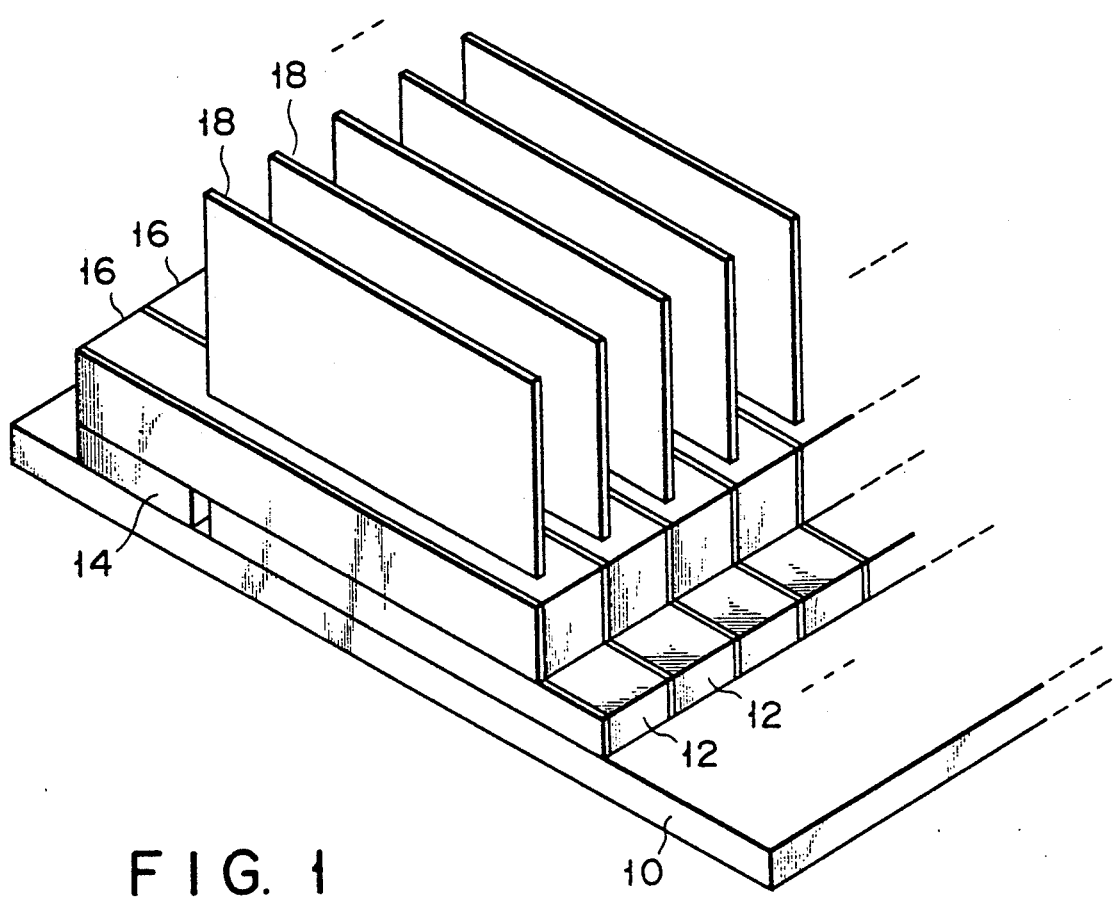
FIG. 1 is a diagram showing an X-ray detector according to a first embodiment of this invention.

There will now be described an embodiment of this invention with reference to the accompanying drawings. FIG. 1 is a diagram schematically showing an X-ray detector according to a first embodiment of this invention. Photodiodes 12 serving as photoelectric converting elements and a light emitting diode (LED) 14 serving as a flat light emitting element which is arranged on one ends of the photodiodes 12 are disposed on the upper surface of a base plate 10. The photodiodes 12 is divided into plural channels by means of insulating members. That is, the detector is a multi-channel type X-ray detector. The other ends of the photodiodes 12 which are opposite to the LED 14 are used as output terminals and a photoelectric conversion output signal of each channel is supplied to a data acquisition system via an electrically conductive line (not shown) formed on the base plate 10. The data acquisition system includes a current-to-voltage (I/V) converter, an integrator, multiplexer, an analog-to-digital (A/D) converter and the like for each channel.

Scintillators 16 are disposed on the photodiodes 12 and LED 14. Also, the scintillators 16 are divided into a number of channels corresponding to the channels of the photodiodes 12 by light shielding members. Coating material which permits X-rays to pass and reflects light is basically coated on the surface of each of the scintillators 16 for light shielding so as to prevent internally generated scintillation light from being leaked to the exterior, but the surfaces thereof in contact with the photodiodes 12 and the LED 14 are not coated so as to permit light to pass therethrough. That is, when scintillation light generated in the scintillators 16 in response to the incident X-rays is projected onto the photodiodes 12. When light generated from the LED 14 is projected onto the scintillators 16, the light is diffused in the entire portion of the scintillators 16 while it is being reflected on the surface thereof. Collimators 18 are disposed on the upper portions of the boundary lines of the scintillators 16 of respective channels.

According to the above detector, when X-rays are irradiated onto the base plate 10 from the above, the collimators 18 permit only the X-rays which are irradiated onto the base plate 10 in a direction perpendicular to the base plate 10 to be received by the scintillators 16. Then, the scintillators 16 generate scintillation light corresponding to the received X-rays and the scintillation light is received by the photodiodes 12 which lie under the scintillators 16. As a result, electric signals corresponding to the received X-rays for respective channels are generated from the photodiodes 12 and supplied to the data acquisition system via electrically conductive lines (not shown). When it is determined that the scintillators 16 are colored with an increase in the amount (which is not the amount of received X-rays in one operation cycle but is the integrated amount of received X-rays in the past operation cycles) of X-rays received by the scintillators 16, that is, it is determined that the sensitivity of the detector is degraded by the radiation damage phenomenon, the LED 14 is turned on to project light into the scintillators 16 so as to activate the scintillators 16 while the detector is set in the inoperative state, that is, while X-rays are not irradiated on the scintillators 16.

As described above, according to the first embodiment, in the X-ray detector including the scintillators 16 and photoelectric converting elements 12, part of each of the scintillators 16 is formed to extend so as not to be made in contact with the corresponding photoelectric converting element 12 and the light emitting element 14 which is made in contact with the extended portions of the scintillators 16 is formed on the surface of the base plate 10 on which the photoelectric converting elements 12 are disposed so that light from the light emitting element 14 can be applied to the scintillators 16 to compensate for the radiation damage of the scintillators 16, thereby preventing the sensitivity of the detector from being degraded.

Figure 2:
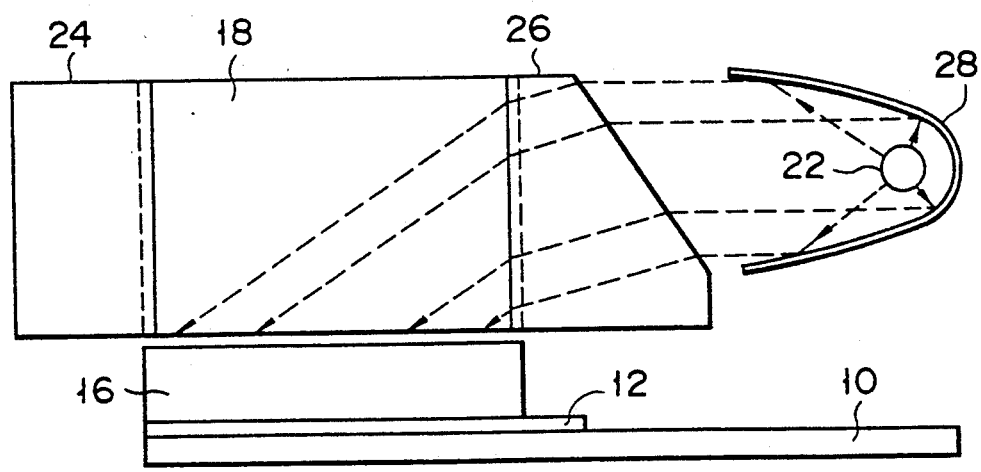
FIG. 2 is a diagram showing an X-ray detector according to a second embodiment of this invention.
Figure 3:
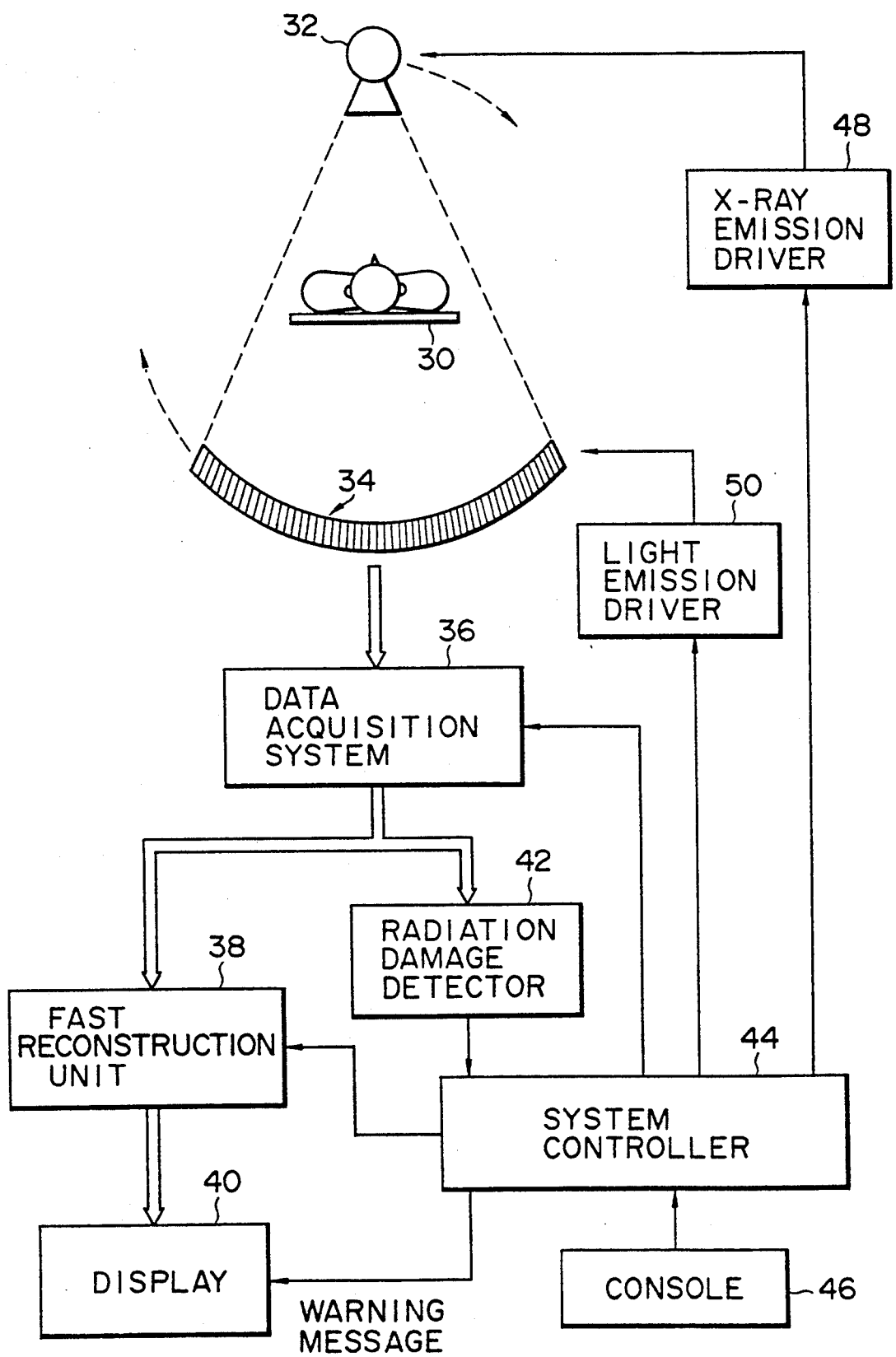
FIG. 3 is a block diagram of an X-ray CT scanner device according to a third embodiment of this invention and using one of the X-ray detectors according to the first and second embodiments.

FIG. 2 is a diagram obtained when laterally viewing an X-ray detector according to a second embodiment. Portions which are the same as those of the first embodiment are denoted by the same reference numerals. In the first embodiment, the flat light emitting element 14 is disposed on the surface of the base plate 10 as the light source for recovering the scintillators 16 from the radiation damage, but in the second embodiment, a lamp 22 is disposed above the base plate 10 instead of the LED 14. One of supporting members 24 and 26 of collimators 18 which is closer to the lamp 22, that is, the supporting member 26 is constructed by a prism of transparent material having a polygonal cross section so as to permit light from the lamp 22 to be transmitted through a space between the collimators 18 and projected onto the entire portion of scintillators 16. In this case, the supporting member 26 is not limited to the prism but may be a concave or convex lens for directing light from the lamp 22 to the scintillators 16. Further, the other collimator supporting member 24 may be formed of any material but may be generally formed of ceramics, glass epoxy resin or the like. A concave mirror 28 is provided for the lamp 22 so as to permit the light therefrom to be projected onto the supporting member 26 at a high efficiency. In this embodiment, coating material which permits X-rays and light from the lamp 22 to pass and reflects internally generated scintillation light without transmitting the same is coated on the upper surface of each of the scintillators 16.

With the above construction, since light from the lamp 22 can be irradiated on the entire portion of the scintillators 16, the radiation damage of the scintillators 16 can be compensated for.

As described above, according to the second embodiment, in the X-ray detector having the collimators 18, scintillators 16, and photoelectric converting elements 12, the lamp 22 is disposed by the side of the collimators 18 and the collimator supporting member 26 is formed of transparent material and constructed to direct light to the scintillators 16 so that light generated from the lamp 22 can be passed through the supporting member 26 and a space between the two collimators 18 and projected onto the scintillators 16 at a high efficiency, thereby making it possible to compensate for the radiation damage of the scintillators 16.

Next, an X-ray CT scanner device according to a third embodiment of this invention which includes the X-ray detector of the first or second embodiment is explained. In this example, an X-ray CT scanner of a third-generation type is explained. An X-ray tube 32 and a detector array 34 are arranged in opposition to each other on both sides of a bed 30 on which a patient is laid. The detector array 34 is constructed by arranging a plurality of detectors of the first or second embodiment in an arc configuration. The X-ray tube 32 radiates X-rays in a sector form to the patient and the detector array 34 detects the amount of X-rays which have passed through the patient for each channel. The X-ray tube 32 and the detector array 34 are mounted in gantry (not shown) so as to rotate around the patient with the relation between them kept unchanged.

Each channel output (X-ray projection data) of the detector array 34 is collected by a data acquisition system (DAS) 36 including an I/V converter, integrator, multiplexer, A/D converter and the like for each channel, and variation in the characteristic in each channel is corrected by a pre-processing unit which is provided therein. The X-ray projection data output from the DAS 36 is supplied to a fast reconstruction unit (FRU)

38 and is subjected to the reconstruction process to produce a tomographic image or a slice image. The slice image is displayed on a display 40.

The output of the DAS 36 is also supplied to a radiation damage detector 42. The detector 42 detects the degree of radiation damage of the scintillators in the detector array 34 based on the output of the DAS 36. The detection result is input to a system controller 44. The system controller 44 controls the DAS 36, FRU 38, display 40, X-ray emission driver 48 and light emission driver 50 based on the detection result and various instruction signals from a console 46. The light emission driver 50 controls the ON/OFF state of the light source (which is the LED 14 in the case of using the detector of the first embodiment and the lamp 22 in the case of using the detector of the second embodiment) of each detector in the detector array 34. Further, the system controller 44 controls a gantry driving mechanism (not shown).

Figure 4:
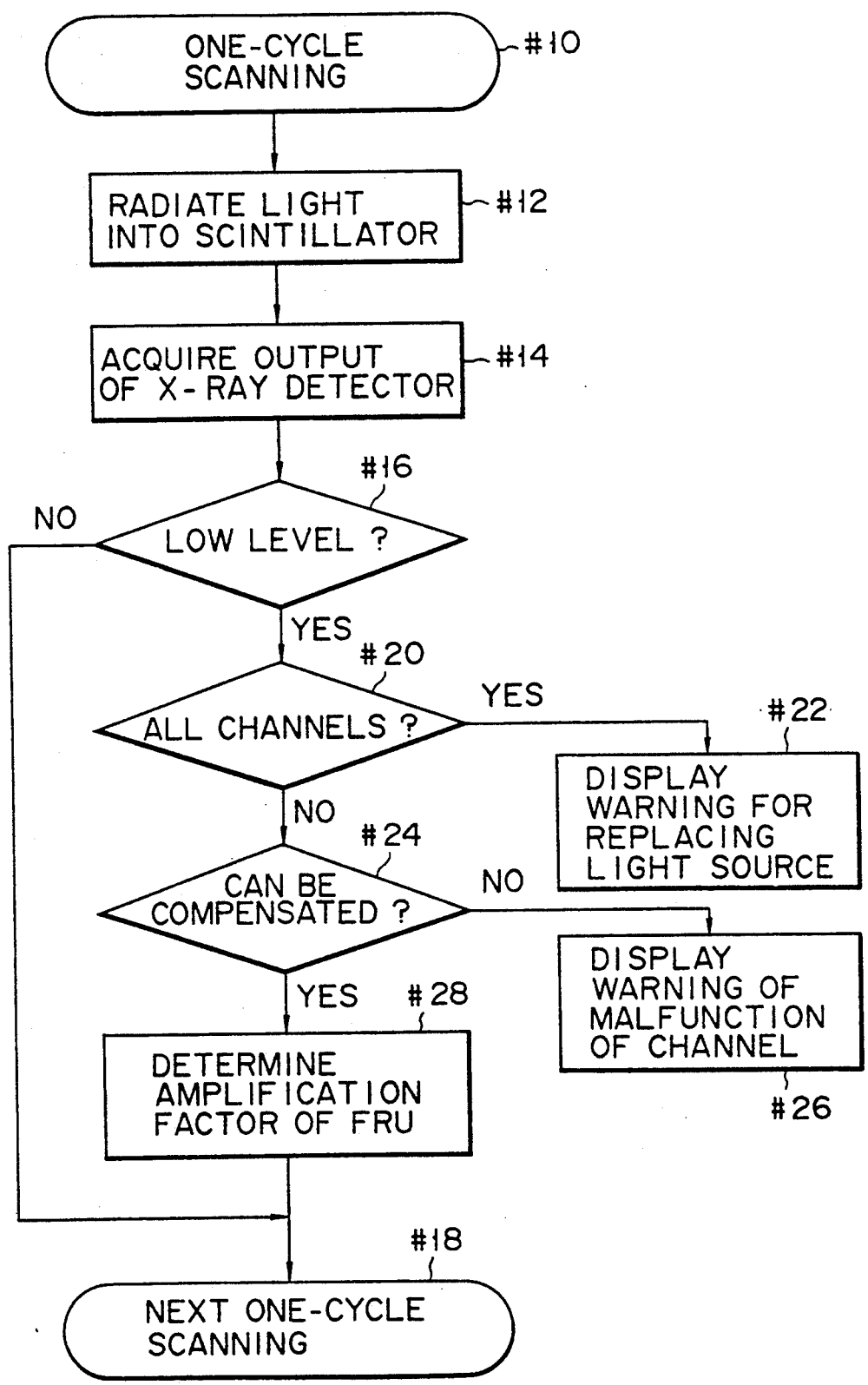
FIG. 4 is a flowchart illustrating the operation of the third embodiment.

Now, the operation of the system controller 44 is explained with reference to the flowchart shown in FIG. 4. When one scanning cycle (one cycle of radiation of X-rays) is completed in the step #10, the system controller 44 controls the light emission driver 50 to turn on the light sources of all of the detectors in the detector array 34 so as to project light into the scintillators a shown in the step #12. When the degree of radiation damage of the scintillators is small, the radiation damage may be compensated for by projection of light, permitting the next scanning operation to be immediately effected. However, if the degree of radiation damage of the scintillators is large, degradation of the detection sensitivity must be compensated for by other means. For this purpose, an output generated from the X-ray detector array 34 at the time of projecting light is acquired in the step #14.

When the operation of acquiring the detection output is completed, the light emitting elements are turned off. The output of each channel is compared with a reference value corresponding to the light emission amount of the light source in the step #16 to determine whether or not the output level of any one of the channels is lower than the reference value. When the output levels of all of the channels are higher than the reference value, it is determined that radiation damage of the scintillators has not occurred or the radiation damage has been compensated for by projection of light even if the radiation damage has occurred, and a next scanning operation is immediately effected in the step #18.

In a case where the output level of at least one of the channels is not higher than the reference value, it is determined in the step #20 whether or not the output levels of all of the channels are lower than the reference value. When the output levels of all of the channels are lower than the reference value, it is determined in the step #22 that the service life of the light source has terminated and warning informing to that effect is displayed on the display unit 40. When the output levels of not all but one or more of the channels are lower than the reference level, it is determined in the step #24 whether the output level is set within a compensable range or not. When the output level is so low as not to be compensated for, warning indicating malfunction of the data acquisition system 36 and/or the detector 34 of the corresponding channel is displayed on the display unit 40 in the step #26. When the output level is within the compensable range, compensation data indicating a amplification factor of the FRU 38 corresponding to a level difference between the detected output level and the reference value is created and stored in the step #28. The compensation data is supplied to the FRU 38 which in turn amplifies the output of the DAS 36 according to the compensation data, thus compensating for the degradation of the sensitivity.

According to the third embodiment of the above construction, the light source is turned on at the time of interruption of the scanning operation to project light onto the scintillators, thereby compensating for the radiation damage. Further, in a case where the amount of light to be projected is not sufficiently large to compensate for the radiation damage when the radiation damage is large or when the interruption time of the scanning operation is short, the amplification factor of the pre-processing unit of the FRU 38 is controlled according to the detected level so as to compensate for degradation of the detection sensitivity. Thus, degradation of the sensitivity of the detector can be prevented and occurrence of a artifact in the reconstructed slice image due to the history of X-ray radiation to the scintillators can be prevented, thereby making it possible to provide a tomographic image of high quality. Further, since whether the output of each channel is normal or not can be determined by projecting light onto the scintillators, the operation of the DAS and the detector of each channel can be checked before radiation of X-rays.

In the above explanation, the light source is turned on each time one scanning cycle is completed, but it is also possible to emit light each time a preset number of scanning cycles are completed. Further, it is possible to turn on the light source before each scanning operation is started. In practice, if no scanning interruption time is provided in such a case a in the dynamic scanning operation light must be projected before starting the scanning operation.

Figure 5:
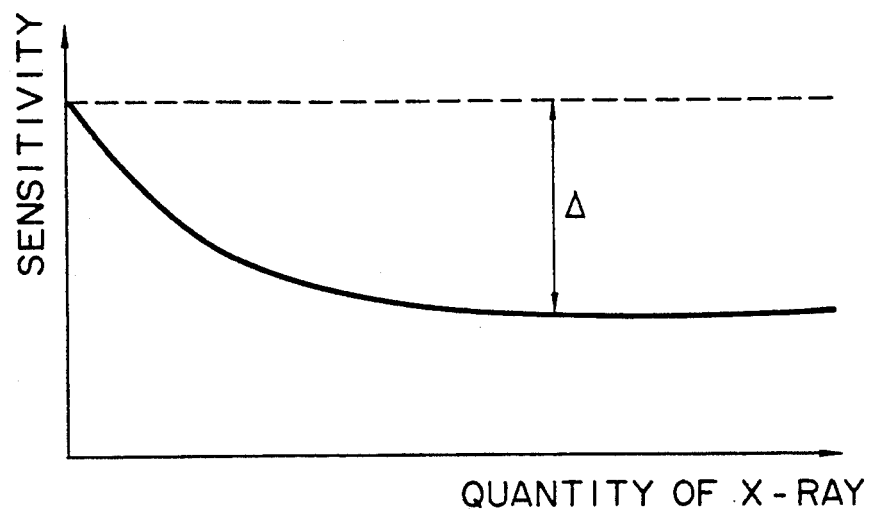
FIG. 5 is a diagram showing the characteristic of a general scintillator.

Next, an X-ray CT scanner device according to a fourth embodiment is explained. In general, degradation damage will not be made lower than a predetermined value as shown in FIG. 5. Therefore, if the scintillator is used after the sensitivity has been lowered to the predetermined value, the detection sensitivity of the scintillator will be kept unchanged irrespective of the amount of X-ray radiation thereto but the level thereof becomes lower than that in the initial condition by a predetermined amount.

Figure 6:
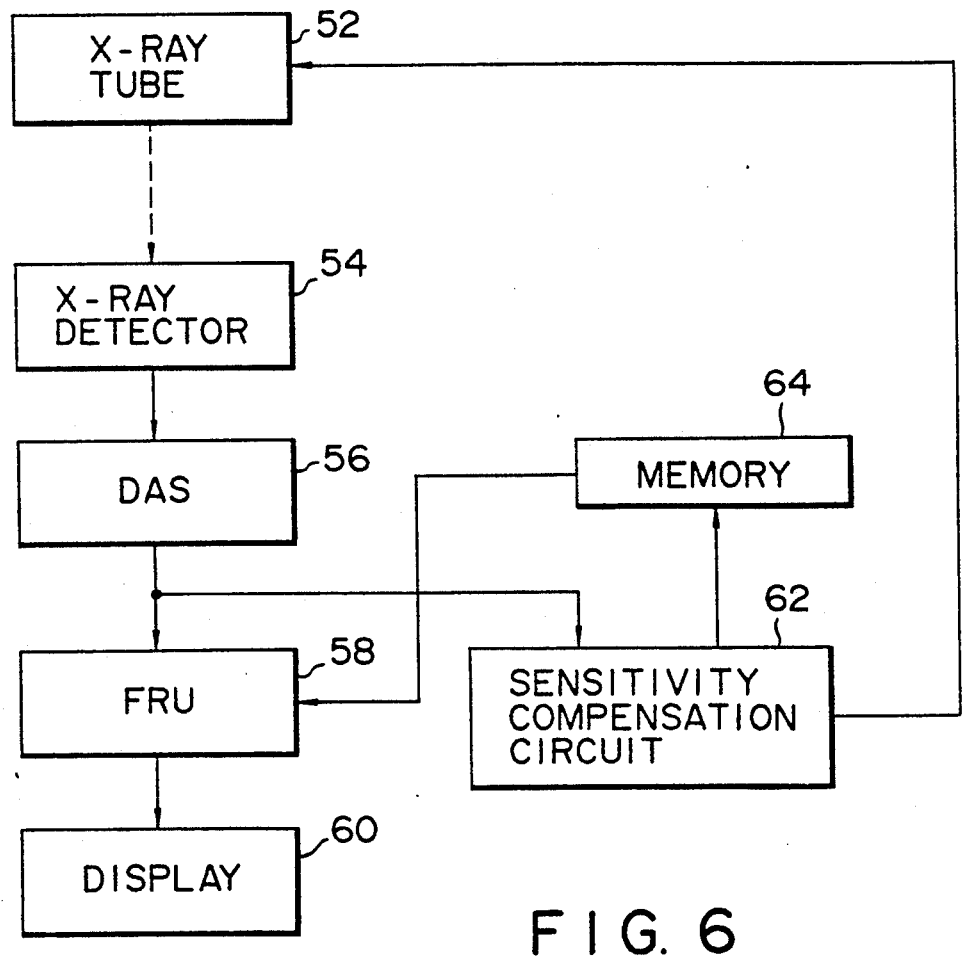
FIG. 6 is a block diagram of an X-ray CT scanner device according to a fourth embodiment of this invention.

The fourth embodiment is an X-ray CT scanner device which is constructed by using a detector having scintillators set in the above condition. FIG. 6 is a block diagram of the above X-ray CT scanner device. X-rays passing through a patient are received by a detector 54, an output of the detector 54 is supplied to an FRU 58 via a DAS 56, and an image obtained in the FRU 58 is displayed on a display unit 60. An output of the DAS 56 is input to a sensitivity compensation circuit 62. The compensation circuit 62 continuously projects X-rays from the X-ray tube 52 to the detector 54 (of course, at this time, the object is not laid between the X-ray tube 52 and the detector 54) before the CT scanner device is actually used to monitor the degree of degradation in the sensitivity of the detector according to the output of the DAS 56. Then, the X-rays are continuously radiated until the sensitivity has converged on the predetermined level as shown in FIG. 5. When the predetermined level is reached, radiation of the X-rays is interrupted and an amplification factor for amplifying the detection output to a value obtained at the initial time of X-ray radiation is determined according to a level difference Δ between the level at this time and the output of the detector 54 at the initial time of X-ray radiation and the amplification factor is stored into a memory 64. The memory 64 is a nonvolatile memory. Thus, the initial adjustment of the fourth embodiment is completed. The sensitivity compensation circuit 62 may be omitted after the initial adjustment is completed.

In practical use, the FRU 58 amplifies the output of the DAS 56 according to the amplification factor stored in the memory 64. Since the sensitivity of the scintillator which is practically used is constant, the output of the detector 54 can always be set to a value which is set when the sensitivity of the scintillator is at the initial value.

As described above, according to the fourth embodiment, since the sensitivity of the scintillator is lowered to the predetermined value prior to practical use and the output of the detector is amplified to compensate for a predetermined drop of the sensitivity so that the sensitivity of the scintillator can be kept unchanged even if the amount (integrated amount) of X-ray radiation is increased, degradation of the detection sensitivity of the detector and occurrence of the artifact in the reconstructed image can be prevented.

As described above, according to this invention, an X-ray detector can be provided in which degradation in the detection sensitivity of the scintillator due to the radiation damage phenomenon can be prevented by projecting light onto the scintillator. Further, according to this invention, an X-ray CT scanner device can be provided in which, when X-rays are not applied to the detector in such a case as in the interruption time of the scanning operation, light is projected to the scintillator to prevent occurrence of X-ray radiation history with respect to the detection signal due to coloring of the scintillator, and as a result, occurrence of the artifact in the reconstructed image can be prevented. Further, according to this invention, an X-ray CT scanner device can be provided in which light is projected onto the scintillator prior to radiation of X-rays to a patient and the output of the detector is monitored so that whether the detector and the data acquisition system are normal or not can be checked. Further, according to this invention, an X-ray detector can be provided in which X-rays are irradiated to the scintillator of the X-ray detector until the sensitivity thereof is converged on a predetermined value prior to the practical use, data corresponding to the degree of degradation in the sensitivity is stored, and the output of the detector is amplified according to the stored data at the time of practical use so as to prevent occurrence of radiation damage phenomenon.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An X-ray CT scanner device comprising:
   means for irradiating X-rays to an object;
   scintillator means for receiving X-rays passing through the object and generating scintillation light corresponding to the received X-rays;
   photoelectric converting means for receiving the scintillation light and generating an electric signal corresponding to the received scintillation light;
   means for processing an output of said photoelectric converting means to produce a tomographic image; and
   means, operated in connection with the operation of said X-ray irradiating means, for projecting light to said scintillator means when X-rays are not irradiated on said scintillator means.

2. A device according to claim 1, further comprising:
   means for detecting an output of said photoelectric converting means while said light projecting means is projecting light to said scintillator means; and
   means for comparing the detected output of said detecting means with a preset value to determine whether or not said photoelectric converting means and light projecting means are operated correctly.

3. A device according to claim 2, in which said scintillator means and said photoelectric converting means are divided into a number of channels and said comparing means determines for each channel whether or not said photoelectric converting means and said light projecting means are correctly operated.

4. A device according to claim 3, in which said comparing means determines that the service life of said light projecting means is terminated when the outputs of said photoelectric converting means of all channels become lower than the preset value.

5. A device according to claim 1, further comprising:
   means for detecting an output of said photoelectric converting means while said light projecting means is projecting light to said scintillator means; and
   means for correcting an output generated from said photoelectric converting means while X-rays are irradiated to said scintillator means according to the detection result of said detecting means.

6. A device according to claim 5, in which said scintillator means and said photoelectric converting means are divided into a number of channels and said electric converting means of each channel according to the output of said photoelectric converting means of each channel.

7. A device according to claim 1, in which said scintillator means is formed in a flat plate configuration having first and second surfaces, X-rays are irradiated on the first surface thereof, said photoelectric converting means is arranged in contact with part of the second surface of said scintillator means and said light projection means includes a light emitting member which is formed in a flat plate configuration and arranged in contact with the remaining part of the second surface of said scintillator means.

8. A device according to claim 1, in which said scintillator means is formed in a flat plate configuration having first and second surfaces, X-rays are irradiated on the first surface thereof, said photoelectric converting means is arranged in contact with the second surface of said scintillator means and said light projection means includes a light emitting member which projects light onto the first surface of said scintillator means.

9. A device according to claim 8, in which said scintillator means includes a collimator disposed on the first surface for setting the incident direction of the X-rays to a predetermined direction and said light projecting means projects light from said light emitting member via a prism which also serves as a supporting member for said collimator.

10. An X-ray detector device comprising:
scintillator means for producing scintillation light corresponding to incident X-rays;
photoelectric converting means for receiving the scintillation light and generating an electric signal corresponding to the received scintillation light; and
mean for projecting light onto said scintillator means.

11. A device according to claim 10, in which said scintillator means is formed in a flat plate configuration having first and second surfaces, X-rays are irradiated on the first surface thereof, said photoelectric converting means is arranged in contact with part of the second surface of said scintillator means and said light projection means includes a light emitting member which is formed in a flat plate configuration and arranged in contact with the remaining part of the second surface of said scintillator means.

12. A device according to claim 10, in which said scintillator means is formed in a flat plate configuration having first and second surfaces, X-rays are irradiated on the first surface thereof, said photoelectric converting means is arranged in contact with the second surface of said scintillator means and said light projection means includes a light emitting member which projects light onto the first surface of said scintillator means.

13. A device according to claim 12, in which said scintillator means includes a collimator disposed on the first surface for setting the incident direction of the X-rays to a predetermined direction and said light projecting means projects light from said light emitting member via a prism which also serves as a supporting member for said collimator.

14. A device according to claim 10, in which said light projecting means comprises means for projecting light to said scintillator means while no X-rays are irradiated onto said scintillator means.

15. A method for setting up an X-ray detector having a scintillator and a photoelectric converting element, comprising the steps of:
irradiating X-rays onto said scintillator prior to the practical use of the X-ray detector until an output of said photoelectric converting element is decreased and converged on a predetermined value;
detecting a difference between the predetermined value and an output of said photoelectric converting element obtained at the starting time of X-ray radiation;
storing a correction value corresponding to the detected difference; and
correcting an output of said photoelectric converting element according to the stored correction value at the time of practical use of the X-ray detector.

16. A method according to claim 15, in which said storing step comprises the substep of storing a correction value which permits the correction result at the time of practical use of the X-ray detector to coincide with an output of said photoelectric converting element obtained at the starting time of X-ray radiation.

17. A method according to claim 15, which further comprises the substep of projecting light onto said scintillator while X-rays are not irradiated onto said scintillator at the time of practical use of the X-ray detector.

18. An X-ray detector device comprising:
scintillator means for producing scintillation light corresponding to incident X-rays;
photoelectric converting means for receiving the scintillation light and generating an electric signal corresponding to the received scintillation light; and
means for projecting light onto said scintillator mean to compensate for radiation damage of said scintillator means.

* * * * *